Feb. 13, 1951

E. L. C. WHITE ET AL 2,541,454

CONTROL CIRCUITS FOR ELECTRICAL
OSCILLATION GENERATORS

Filed June 30, 1948

INVENTORS:
Eric Lawrence Casling White
John Bruce Smith
BY J. O. Ollier
ATTORNEY Patented Feb. 13, 1951

2,541,454

UNITED STATES PATENT OFFICE 2,541,454

CONTROL CIRCUITS FOR ELECTRICAL OSCILLATION GENERATORS

Eric Lawrence Casling White, Iver, and John Bruce Smith, Ealing, London, England, assignors to Electric & Musical Industries Limited, Hayes, England, a company of Great Britain Application June 30, 1948, Serial No. 36,128
In Great Britain July 4, 1947

7 Claims. (Cl. 250—36)

This invention relates to control circuits for electrical oscillation generators of the kind in which the phase of generated oscillations is compared with the phase of master oscillations, and means are provided for deriving a control signal which is employed to reduce the phase difference between the generated and the master oscillations.

The object of the present invention is to provide an improved control circuit of the kind described in which any phase difference between said oscillations can be rapidly reduced.

According to a feature of the invention there is provided a circuit of the kind described comprising means responsive to the phase difference between the generated and master oscillations for providing a control signal which suddenly changes in amplitude whenever a particular phase difference occurs between said oscillations and means for applying said control signal to adjust the frequency of said generated oscillations so as to reduce the phase difference.

According to a further feature of the invention there is provided a circuit of the kind described comprising means responsive to said phase difference for providing a control signal which varies in amplitude as the phase difference between said oscillations varies and further means, also responsive to said phase difference, for suddenly changing the amplitude of the control signal whenever a particular phase difference occurs between said oscillations and means for applying said control signal to adjust the frequency of said generated oscillations so as to reduce the phase difference.

In order to reduce the phase difference between said oscillations the frequency of the generated oscillations may be varied in any suitable manner as by the provision of a known form of variable reactance circuit.

Figure 1:
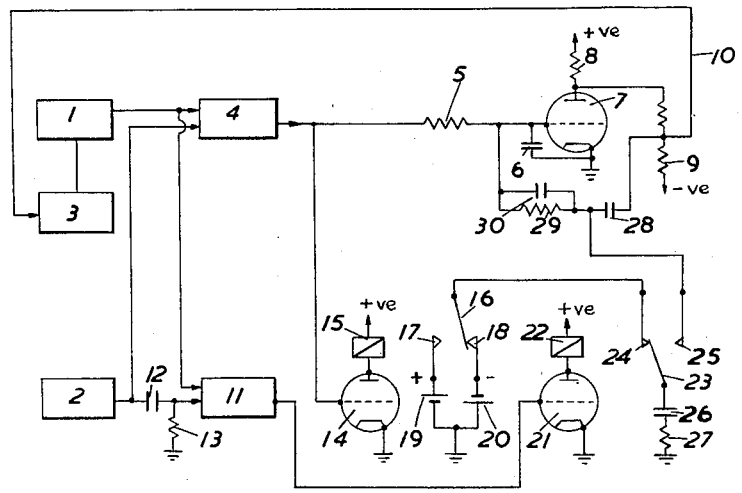
Figure 2:
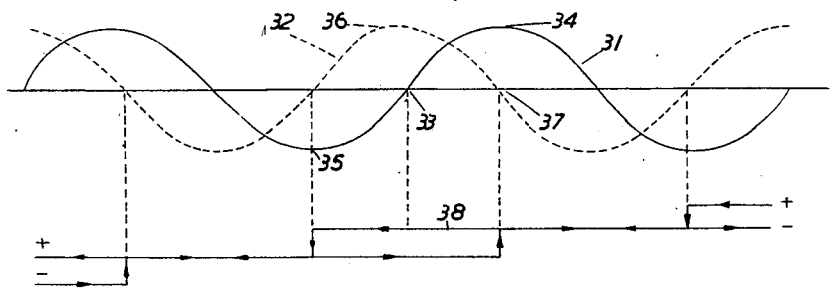
Figure 3:
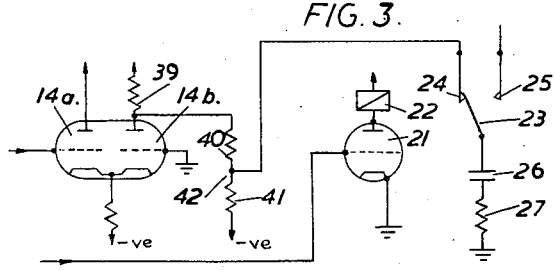

In order that the said invention may be clearly understood and readily carried into effect it will now be more fully described with reference to the accompanying drawings, in which:

Figure 1 shows a circuit arrangement embodying one form of the present invention, Figure 2 is an explanatory diagram, and Figure 3 illustrates a modification of the circuit shown in Figure 1.

As shown in Figure 1, the circuit comprises an oscillator 1 the generated oscillations from which are controlled in frequency by comparing the phase of the generated oscillations with the phase of master oscillations from a source 2 (which may be a mains supply) so as to derive a control signal which is applied to a variable reactance circuit 3 which serves to adjust the frequency of the oscillations generated by the oscillator 1 so that the phase and hence the frequency of the generated oscillations and the oscillations from the source 2 are maintained in synchronism.

The generated and master oscillations are applied to a phase discriminator 4 the output from which provides a control signal which is filtered by a resistor 5 and condenser 6 and applied to the control electrode of valve 7 the anode of which is connected through a load resistance 8 to the positive terminal of a source of anode current, not shown, and also to a potential divider 9 connected to a source of negative potential, not shown, a lead 10 connected to the tap on the potential divider serving to feed the control signal to the variable reactance circuit 3. The generated oscillations and the oscillations from the source 2 are also applied to a second phase discriminator 11 the oscillations from the source 2, however, being shifted approximately 90° in phase with respect to the oscillations from the source 2 which are applied to the discriminator 4, e. g., by means of a condenser 12 and resistance 13 or other known phase-shifting means. The discriminators 4 and 11 may be of the type described in British Patent Specification No. 534,749.

The output from the discriminator 4 is also applied to the control electrode of a valve 14 provided in its anode circuit with a relay 15 which serves to actuate a movable contact 16 which is caused to engage either of a pair of fixed contacts 17 and 18 which are connected respectively to sources of negative and positive potentials indicated at 19 and 20.

The output from the discriminator 11 is fed to the control electrode of a valve 21 which is provided in its anode circuit with a relay 22 which serves to actuate a movable contact 23 which can be caused to engage either of a pair of fixed contacts 24 and 25, the movable contact 23 being in circuit with a storage device in the form of a condenser 26, which is in series with a resistance 27 which serves to suppress undesired surges which may arise during the operation of the relay. The movable contact 23 is, as shown, connected to the fixed contact 24 so that the condenser 26 when the contact 23 is in engagement with the contact 24 can store a charge from either of the sources 19 and 20, whilst the contact 25 is connected to the control electrode of valve 7 via a point on a network comprising condenser 28 in series with a resistor 29 shunted by a condenser 30, this network being connected between the anode of valve 8 and its control grid. When the contact 23 is in contact with the contact 25 the condenser 26 discharges into the network which is such that it provides a low impedance for said discharge and causes the potential stored in said condenser to be applied effectively to the control grid of valve 7 so as to produce a sudden change in amplitude of the control signal which is applied to the grid of valve 7 from the discriminator 4. The connection of the network between the anode and the grid of valve 7 serves to linearise the operation of the latter and on the discharge of condenser 26 into the network to apply to the lead 10 a step of voltage to cause said sudden change in amplitude.

In order to explain the operation of the circuit shown in Figure 1, reference will now be made to Figure 2 of the drawings in which the curve 31 indicates the output from the discriminator 4 and the dotted line curve 32 indicates the output from the discriminator 11 which is 90° out of phase with the output from the discriminator 4. If the phase of the master and generated oscillations applied to the discriminator 4 are exactly 90° apart, then the output from the discriminator 4 will be zero as indicated at the point 33 in Figure 2. If a slight increase in the frequency of the generated oscillations occurs so that the phase difference between the oscillations changes, the output from the discriminator 4 increases from the point 33 either positively or negatively depending on the polarity of the connections, the output rising to a maximum positive potential as indicated at point 34 or to a maximum negative potential as indicated at point 35. The output from the discriminator 11 indicated by the curve 32 also varies in a similar manner. The control signal derived from the discriminator 4 is applied via valve 7 and lead 10 to the reactance circuit 3 in such a sense as to tend to cause the phase of the generated and master oscillations to be maintained in synchronism. Before synchronism is obtained, the phase difference may be increasing at a steady rate, i. e., a small constant frequency difference may exist, but because of the characteristics of the phase discriminators the output from these is generally a sine or cosine function of the angular phase difference, and consequently its average value over several complete cycles of phase drift will be zero and no control effect will be exerted.

To overcome this difficulty and enable synchronism to be achieved even though there is a considerable initial frequency difference, an arrangement is provided such that every time the sine of the phase difference passes a particular value, a sudden step is added to the control signal in the correct sense to reduce the frequency difference, depending on the sense of the rate of change of phase difference at the time. As stated above, the output from the discriminator 4 is applied to the control electrode of valve 14 and the movable contact 16 is caused to engage either contact 17 or 18 depending on whether the output from the discriminator 4 is positive or negative so that either the source of positive potential 19 or the source of negative potential 20 respectively is connected via the contact 16 to the condenser 26 which is thereby charged from either of the sources 19 or 20. If the generated and master oscillations are in exact frequency synchronism and 90° apart at the input to discriminator 4, then since as stated above, the master oscillations at the input to the discriminator 11 are 90° out of phase with the master oscillations at the input to the discriminator 4, the output from the discriminator 11 will be a maximum, as indicated at the point 36 in Figure 2. Since, as mentioned above, the output from the discriminator 11 is applied to the valve 21, the valve 21 operates so as to maintain the contact 23 in engagement with the contact 24 so that the condenser 26 is charged from either of the sources 19 and 20. If, however, the relative phases drift until a further difference of 90° occurs between the generated and the master oscillations, the output from the discriminator 11 falls to the value indicated at 37 in Figure 2 i. e., to zero, with the result that the anode current of valve 21 is no longer sufficient to maintain the contact 23 in engagement with the contact 24 and said contact 23 then moves into engagement with contact 25 so that the charge in condenser 26 is then applied via the network 28, 29 and 30 to the valve 7. The charge from condenser 26 thus suddenly increases the amplitude of the control signal so that a rapid variation of the frequency of the generated oscillations is made. This action occurs each time a 0° or 180° phase difference (± any integral multiple of 360°) exists between the generated and the master oscillations so that, assuming that the oscillations are widely different in frequency, a succession of rapid changes in the amplitude of the control signal occurs which serves rapidly to bring the oscillations into frequency synchronism and when frequency synchronism has been reached then phase synchronism is maintained by the output from the discriminator 4 via valve 7. The polarity of the control signal applied to the network 28, 29 and 30 depends on whether the frequency of the generated oscillations is above or below the frequency of the master oscillations, the positive or negative values of control potential being controlled from the output of the discriminator 4 via the valve 14. The waveform of the control potential applied from the condenser 26 to the network 28, 29 and 30 is indicated at 38 in Figure 2, this waveform being repetitive each time the phase difference between the generated oscillations and the master oscillations exceeds 0° or 180° (depending on the sense of the rate of change) by a multiple of 360°.

The sudden changes in amplitude of the signal occurs at the 0° point if the phase is drifting in one direction and at the 180° point if the phase drifts in the opposite direction. When approximate synchronisation has been achieved there is a clear space of ±90° about the equilibrium position in which phase can wander without control by the relay 22, control then being exercised solely by discriminator 4 directly via valve 7.

Figure 3 of the drawings illustrates a modification of part of the circuit shown in Figure 1 in which the valve 14, relay 15, contacts 16, 17 and 18 and the sources 19 and 20 are replaced and a pair of valves 14a and 14b and by a network of three resistances 39, 40 and 41 connected between the anode of valve 14 by a positive potential supply and a negative potential supply as indicated, such that a tapping point 42 on the network is at zero potential when the input to the valve 14a from the discriminator 4 corresponds to point 33 on curve 31, and becomes negative or positive according to the sense of the phase drift. This tapping point 44 is connected to the contact 24 so that the condenser 26 receives a positive or negative charge according to the sense of the phase difference as described above. A cathode-coupled pair of valves 14a and 14b are shown as being a simple form of non-phase-reversing amplifier.

We claim:

1. A control circuit for electric oscillation generators, comprising means for comparing the phase of generated oscillations with the phase of master oscillations, means for deriving a control signal responsive to the phase difference between said generated and master oscillations, a source of potential, means for applying to said control signal a potential from said source to cause said control signal suddenly to change in amplitude whenever a particular phase difference occurs between said oscillations, and means for applying said control signal to adjust the frequency of said generated oscillations to control the phase difference.

2. A control circuit for electric oscillation generators, comprising means for comparing the phase of generated oscillations with the phase of master oscillations, means for deriving a control signal varying in amplitude with the phase difference between said generated and master oscillations, a source of potential, means for applying to said control signal a potential from said source to cause said control signal suddenly to change in amplitude whenever a particular phase difference occurs between said oscillations, and means for applying said control signal to adjust the frequency of said generated oscillations to control said phase difference.

3. A control circuit for electric oscillation generators, comprising a first phase discriminator, means for feeding to said discriminator generated oscillations and master oscillations, a second phase discriminator, means for feeding said generated and master oscillations thereto with one of said oscillations displaced in phase by a predetermined amount compared with the oscillations fed to said first phase discriminator, means for utilising the outputs from said discriminators co-operatively to provide a control signal which suddenly changes in amplitude whenever a particular phase difference occurs between said master and generated oscillations, and means for applying said control signal to adjust the frequency of said generated oscillations to control the phase difference.

4. A control circuit for electric oscillation generators, comprising a first phase discriminator, means for feeding to said discriminator generated oscillations and master oscillations, a second phase discriminator, means for feeding said generated and master oscillations thereto with one of said oscillations displaced in phase by a predetermined amount compared with the oscillations fed to said first phase discriminator, a source of potential, means for controlling the supply of potential from said source under the control of the output from one of said discriminators, means for applying a potential from said source to said control signal under the control of the output from said other discriminator whenever a particular phase difference occurs between said master and generated oscillations, and means for applying said control signal to adjust the frequency of said generated oscillations to control the phase difference.

5. A control circuit for electric oscillation generators, comprising means for comparing the phase of generated oscillations with the phase of master oscillations, means for deriving a control signal responsive to the phase difference between said generated and master oscillations, a source of potential, a storage device, means for coupling said storage device to said source of potential, means for applying a charge from said storage device to said control signal at predetermined time intervals to cause a sudden change in amplitude of said control signal, and means for applying said control signal to adjust the frequency of said generated oscillations to control the phase difference.

6. A control circuit for electric oscillation generators, comprising a first phase discriminator, means for feeding to said discriminator generated oscillations and master oscillations, a second phase discriminator, means for feeding said generated and master oscillations thereto with one of said oscillations displaced in phase by a predetermined amount compared with the oscillations fed to said first phase discriminator, a source of potential, means for varying the sign of the potential from said source under the control of the output from one of said discriminators, means for applying a potential from said source to said control signal under the control of output from said other discriminator whenever a particular phase difference occurs between said master and generated oscillations, and means for applying said control signal to adjust the frequency of said generated oscillations to control said phase difference.

7. A control circuit for electric oscillation generators, comprising a first phase discriminator, means for feeding to said discriminator generated oscillations and master oscillations, a second phase discriminator, means for feeding said generated and master oscillations thereto with one of said oscillations displaced in phase by a predetermined amount compared with the oscillations fed to said first phase discriminator, a source of potential, a storage device, means under the control of one of said phase discriminators for coupling said storage device to said source of potential and for coupling said storage device to apply a potential to said control signal, means under the control of the output from the other discriminator for feeding to said storage device a potential from said source the sign of which is dependent on the sense of the rate of change of phase difference, and means for applying said control signal to adjust the frequency of said generated oscillations to control the phase difference.

ERIC LAWRENCE CASLING WHITE.
JOHN BRUCE SMITH.

REFERENCES CITED

The following references are of record in the file of this patent:

UNITED STATES PATENTS

| Number | Name | Date |
|---|---|---|
| 2,104,801 | Hansell | Jan. 11, 1938 |
| 2,123,716 | Crosby | July 12, 1938 |
| 2,240,428 | Travis | Apr. 29, 1941 |
| 2,232,390 | Katzin | Feb. 18, 1941 |